No. 868,794. PATENTED OCT. 22, 1907.
F. G. MIDGETT, DEC'D.
L. S. MIDGETT, ADMINISTRATRIX.
HYDRANT.
APPLICATION FILED MAY 14, 1906.

WITNESSES:

Franklin G. Midgett,
INVENTOR.
By C. A. Snow & Co.
ATTORNEYS

UNITED STATES PATENT OFFICE.

FRANKLIN G. MIDGETT, OF DALLAS, TEXAS; LILLIE S. MIDGETT ADMINISTRATRIX OF SAID FRANKLIN G. MIDGETT, DECEASED.

HYDRANT.

No. 868,794.      Specification of Letters Patent.      Patented Oct. 22, 1907.

Application filed May 14, 1906. Serial No. 316,748.

*To all whom it may concern:*

Be it known that I, FRANKLIN G. MIDGETT, a citizen of the United States, residing at Dallas, in the county of Dallas and State of Texas, have invented a new and useful Hydrant, of which the following is a specification.

This invention relates to fire plugs or hydrants and its object is to provide a device of this character to which hose may be connected before an engine has been coupled thereto so that water under normal pressure can be directed from the hydrant into the hose before and during the coupling of the engine.

A still further object is to provide a device of this character having mechanism whereby the water may be directed from the engine and into the previously connected hose without the necessity of stopping the flow of water at any time, said flow being instantaneously changed from normal pressure to pump pressure.

Another object is to provide a novel form of valve through which the pressure inlet and pressure outlet normally communicate, said valve when in such position preventing the normal flow of water from the supply through either the pressure inlet or pressure outlet, but said valve being adapted when shifted to maintain the pressure inlet closed but to place the pressure outlet in communication with the interior of the plug to receive water under normal pressure.

With these and other objects in view the invention consists of certain novel features of construction and combinations of parts which will be hereinafter more fully described and pointed out in the claims.

In the accompanying drawings is shown the preferred form of the invention.

Figure 1:
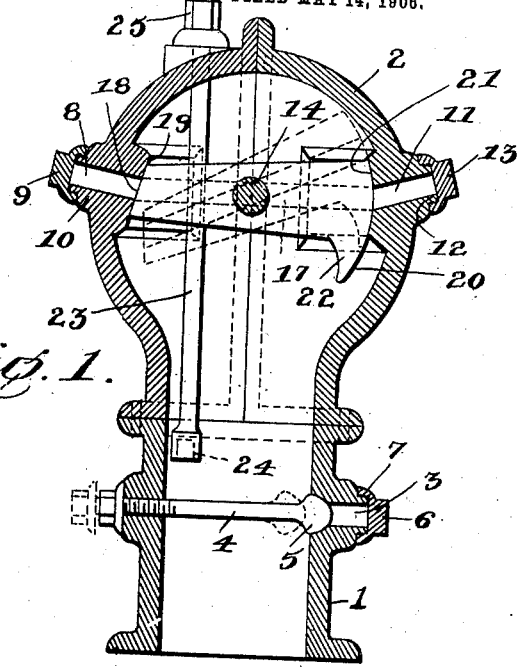
Figure 2:
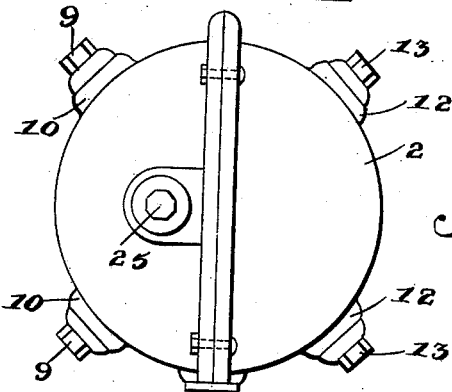
Figure 3:
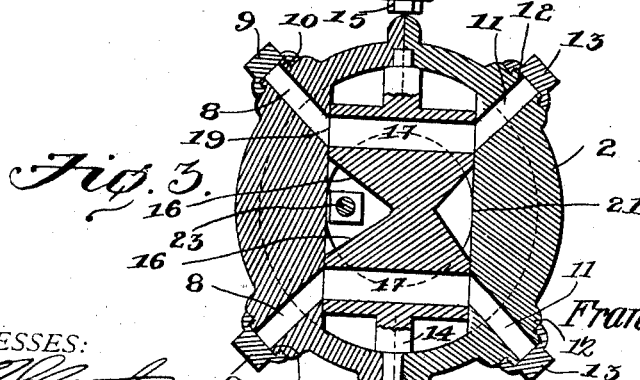

In said drawings: Figure 1 is a vertical section through the device; Fig. 2 is a plan view thereof; and Fig. 3 is a horizontal section through the dome thereof.

Referring to the figures by characters of reference, 1 is a stand pipe having a dome 2 thereon, said dome and stand pipe constituting a casing.

An outlet opening 3 is preferably disposed within the stand pipe and is normally closed by a screw valve 4 the head 5 of which extends from the opposite portion of the stand pipe and is adapted to be rotated by a suitable tool provided for that purpose. The outlet opening 3 is normally covered by a removable cap 6 and has a threaded boss 7 to which the suction tube of an engine may be attached.

A plurality of pressure outlet openings is formed in the dome 2 and each of these openings is normally closed by a removable cap 9, the threaded boss 10 of which surrounds each opening and, when the cap is disengaged therefrom, each boss may be connected to the fire hose in any desired manner. Pressure inlet openings 11 are formed in the dome at points opposite the openings 8 and each is likewise surrounded by a threaded boss 12 adapted to be engaged by a removable cap 13 or by the outlet or discharge hose of a fire engine.

A spindle 14 extends transversely through the center of the dome and between the inlet 11 and the outlets 8 and this stem is rotatably mounted and has a head 15 at one end adapted to be engaged by a tool whereby the stem can be easily manipulated.

Connected to the stem and movable therewith is a valve 16 of novel form having passages 17 therein which are adapted to normally register at one end with the inlet openings 11 and their other ends will normally register with the outlet openings 8. One end of the valve 16 is beveled as at 18 so as to bear against an inclined face 19 formed within the dome at the inner ends of the openings 8, said face constituting a stop for the valve and when the valve and face are in contact a tight joint is produced through which leakage can not occur to any appreciable extent. The other end of the valve is curved concentric with the center of the stem 14 as shown at 20 and bears snugly against but is adapted to slide upon a correspondingly curved face 21 located at the inner end of the inlet openings 11. An extension 22 projects from this curved end of the valve and is correspondingly curved so that when the valve is swung upward the extension 22 will serve to close the inlet openings 11.

A rod 23 is mounted within the top of the dome and is suspended therefrom said rod having a socket 24 in its lower end constituting a wrench adapted to be placed in engagement with a valve stem, not shown, for the purpose of cutting off the supply of water to the plug. This rod has a head 25 at its upper end whereby it may be rotated by means of a suitable tool. The rod 23 preferably extends through the valve 16 but will not interfere with the actuation of said valve.

It will be understood that the valve 16 is normally in position between the openings 8 and 11 so that water can not escape from the interior of the hydrant or plug to said openings although the openings communicate through the passage 17. In the event of a fire the caps 9 are removed and fire hose connected to the bosses 10. The valve 16 is then rotated by means of stem 14 of head 15 and the openings 8 will therefore be free to receive water from the interior of the plug although opening 11 will be maintained closed by the extension 22. The water will thus be discharged under normal pressure into the hose and can be used until the fire engine has arrived and been properly coupled to the plug. The engine is coupled thereto by connecting its suction tube to the boss 7 and then securing its outlet hose to the boss 12 adjacent opening 11. The valve 4 is then opened by rotating the threaded stem thereon and valve 16 is swung back to its normal position so that the passages 17 will register with the inlet openings 11 and the outlets 8. Water will thus be sucked into the engine from the outlet 3 and forced under pressure into either inlet opening 11 and thence through the passage 17 to the outlets 8. It does not become necessary to delay the connection of the hose until the engine is in condition to pump and therefore considerable saving of time results. The stand pipe 1 and the dome 2 are ordinarily filled with water but in freezing weather water can be turned off from the plug by means of the socketed rod 23 and can be drained in any suitable manner as by opening the valve 4.

Importance is attached to the fact that the valve 16 when in its normal position prevents the escape of water through either the pressure inlets or the pressure outlets, but when in this normal position permits water removed through the suction outlet 3 to be forced through any one of the pressure inlets and through the valve to one of the pressure outlets. If it is desired to permit the escape of water under normal pressure from the stand pipe 1 to one of the outlets 8 it is necessary to turn the valve out of its normal position but when so turned it continues to close the pressure inlets but allows the water contained within the dome to flow under normal pressure through the outlets.

What is claimed is:

1. A device of the character described comprising a casing having a water inlet, a suction outlet, means for closing said outlet, a pressure inlet and a pressure outlet, a valve within the casing and normally preventing the escape of water from the casing and into the pressure inlet and outlet, said valve having a passage normally connecting the pressure inlet and outlet, and means for turning the valve to permit the flow of water under normal pressure from the interior of the casing to the pressure outlet, said valve being disposed to constantly close the pressure inlet against the escape of water therethrough from the interior of the casing.

2. A device of the character described comprising a casing having a water inlet, a normally closed suction outlet, said casing having a pressure inlet and a pressure outlet oppositely disposed, a valve within the casing and normally in position to prevent the escape of water from the interior of the casing through the pressure outlet and pressure inlet, said valve having a passage therethrough through which the pressure inlet and outlet normally communicate, means for moving the valve to permit the escape of water from the casing through the pressure outlet, and means upon said valve for closing the pressure inlet while the pressure outlet is open to receive water from the interior of the casing.

3. A device of the character described comprising a casing having a water inlet and a suction outlet, a valve for closing said outlet, said casing also having oppositely disposed pressure inlets and a pressure outlet, a valve within the casing and normally closing the pressure inlets and outlets to prevent the escape of water therethrough from the casing, said valve having passages therein through which the pressure inlets normally communicate with the pressure outlets, means for moving the valve to open the pressure outlets to receive water directly from the interior of the casing, and means movable with the valve for maintaining the pressure inlets closed while the pressure outlets are open.

4. A device of the character described comprising a casing having a water inlet, a normally closed suction outlet, said casing having a pressure inlet and a pressure outlet oppositely disposed, a valve within the casing and normally in position to prevent the escape of water from the interior of the casing through the pressure outlet and pressure inlet, said valve having a passage therethrough through which the pressure inlet and outlet normally communicate, means for moving the valve to permit the escape of water from the casing through the pressure outlet, means upon said valve for closing the pressure inlet while the pressure outlet is open to receive water from the interior of the casing, and means for limiting the movement of the valve in one direction when the passage therein registers with the pressure inlet and outlet.

5. A device of the character described comprising a stand pipe having a suction outlet, a valve normally closing said outlet, a dome upon the stand pipe and adapted to receive water therefrom, said dome having a pressure inlet and a pressure outlet, a valve mounted within the dome and normally closing communication between the interior of the dome and the pressure inlet and outlet, said valve having a passage therethrough through which the pressure inlet and outlet normally communicate, and means for moving the valve to place the pressure outlet in communication with the interior of the dome, said valve being disposed to maintain the pressure inlet constantly out of communication with the interior of the dome.

6. A device of the character described comprising a standpipe having a suction outlet, a valve normally closing said outlet, a dome upon the stand pipe and adapted to receive water therefrom, said dome having a pressure inlet and a pressure outlet, a valve mounted within the dome and normally closing communication between the interior of the dome and the pressure inlet and outlet, said valve having a passage therethrough through which the pressure inlet and outlet normally communicate, and means for moving the valve to place the pressure outlet in communication with the interior of the dome, and means movable with the valve for maintaining the pressure inlet out of communication with the interior of the dome when the pressure outlet is in communication with the interior of the dome.

In testimony that I claim the foregoing as my own, I have hereto affixed my signature in the presence of two witnesses.

FRANKLIN G. MIDGETT.

Witnesses:
  JOHN F. DOOLEY,
  JOHN M. DOBBINS.